(12) United States Patent
Hewlett

(10) Patent No.: US 7,535,622 B2
(45) Date of Patent: May 19, 2009

(54) PROGRAMMABLE LIGHT BEAM SHAPE ALTERING DEVICE USING PROGRAMMABLE MICROMIRRORS

(75) Inventor: William E. Hewlett, Derby (GB)

(73) Assignee: Production Resource Group, LLC, New Windsor, NY (US)

( * ) Notice: Subject to any disclaimer, the term of this patent is extended or adjusted under 35 U.S.C. 154(b) by 0 days.

(21) Appl. No.: 11/747,854

(22) Filed: May 11, 2007

(65) Prior Publication Data

US 2007/0211469 A1    Sep. 13, 2007

Related U.S. Application Data

(60) Division of application No. 10/373,412, filed on Feb. 24, 2003, now Pat. No. 7,224,509, which is a division of application No. 10/197,963, filed on Jul. 16, 2002, now Pat. No. 6,771,411, which is a continuation of application No. 09/928,220, filed on Aug. 9, 2001, now Pat. No. 6,421,165, which is a continuation of application No. 09/359,064, filed on Jul. 21, 1999, now Pat. No. 6,288,828, which is a division of application No. 08/962,237, filed on Oct. 31, 1997, now Pat. No. 5,953,151, which is a division of application No. 08/598,077, filed on Feb. 7, 1996, now Pat. No. 5,828,485.

(51) Int. Cl.
*G02B 26/00* (2006.01)
*G03B 21/26* (2006.01)
*G06T 11/20* (2006.01)

(52) U.S. Cl. .................. 359/291; 359/290; 359/462; 359/900; 353/30; 345/441; 375/240.12; 348/218.1

(58) Field of Classification Search ......... 359/290–292, 359/298, 462, 464, 850, 900; 353/30, 31, 353/85; 345/16, 441, 646; 348/180, 181, 348/184, 218.1, 294, E9.028, E13.033, E5.142; 382/162, 167, 209; 375/240.12, 240.19; 362/283; 378/5; 250/208.1

See application file for complete search history.

(56) References Cited

U.S. PATENT DOCUMENTS 3,401,262 A    9/1968   Fergason et al.

(Continued)

FOREIGN PATENT DOCUMENTS

EP    0 385 706    9/1990

(Continued)

OTHER PUBLICATIONS

Lemme, Helmuth, "Bildprojektoren überholen Großdisplays", *Elektronik*, 45(2):56-58, 63-64, 66, 68-70, Feb. 1996 (translation included).

*Primary Examiner*—Loha Ben
(74) *Attorney, Agent, or Firm*—Law Ofc SC Harris, Inc

(57) ABSTRACT

A digital micromirror device ("DMD") is used to alter the shape of light that is projected onto a stage. The DMD selectively reflects some light, thereby shaping the light that is projected onto the stage. The control for the alteration is controlled by an image. That image can be processed, thereby carrying out image processing effects on the shape of the light that is displayed. One preferred application follows the shape of the performer and illuminates the performer using a shape that adaptively follows the performer's image. This results in a shadowless follow spot.

52 Claims, 10 Drawing Sheets

U.S. PATENT DOCUMENTS

| | | | |
|---|---|---|---|
| 3,622,692 | A | 11/1971 | Stephens, Jr. |
| 3,912,386 | A | 10/1975 | Gorog et al. |
| 3,986,022 | A | 10/1976 | Hyatt |
| 4,384,338 | A | 5/1983 | Bennett |
| 4,392,187 | A | 7/1983 | Bornhorst |
| 4,486,785 | A | 12/1984 | Lasher et al. |
| 4,752,964 | A | 6/1988 | Okada et al. |
| 4,886,776 | A | 12/1989 | Early et al. |
| 4,891,738 | A | 1/1990 | Richardson et al. |
| 4,947,302 | A | 8/1990 | Callahan |
| 4,949,020 | A | 8/1990 | Warren et al. |
| 5,023,709 | A | 6/1991 | Kita et al. |
| 5,062,689 | A | 11/1991 | Koehler |
| 5,113,332 | A | 5/1992 | Richardson |
| 5,143,444 | A | 9/1992 | Shields |
| 5,225,875 | A | 7/1993 | Shapiro et al. |
| 5,228,856 | A | 7/1993 | Chang et al. |
| 5,231,388 | A | 7/1993 | Stoltz |
| 5,282,121 | A | 1/1994 | Bornhorst et al. |
| 5,301,004 | A | 4/1994 | Percival et al. |
| 5,325,116 | A | 6/1994 | Sampsell |
| 5,325,473 | A | 6/1994 | Monroe et al. |
| 5,327,286 | A | 7/1994 | Sampsell et al. |
| 5,331,359 | A | 7/1994 | Leclercq |
| 5,386,250 | A | 1/1995 | Guerinot |
| 5,406,176 | A | 4/1995 | Sugden |
| 5,426,476 | A | 6/1995 | Fussell et al. |
| 5,426,576 | A | 6/1995 | Hewlett |
| 5,448,314 | A | 9/1995 | Heimbuch et al. |
| 5,452,024 | A | 9/1995 | Sampsell |
| 5,452,105 | A | 9/1995 | Tamagaki et al. |
| 5,457,493 | A | 10/1995 | Leddy et al. |
| 5,467,146 | A | 11/1995 | Huang et al. |
| 5,467,412 | A | 11/1995 | Capitant et al. |
| 5,473,531 | A | 12/1995 | Flora-Holmquist et al. |
| 5,502,627 | A | 3/1996 | Hunt et al. |
| 5,528,194 | A | 6/1996 | Ohtani et al. |
| 5,569,907 | A * | 10/1996 | Meunier .................. 250/208.1 |
| 5,583,688 | A | 12/1996 | Hornbeck |
| 5,585,945 | A | 12/1996 | Ikeda et al. |
| 5,612,814 | A | 3/1997 | Yang |
| 5,633,061 | A | 5/1997 | Hewlett |
| 5,633,755 | A | 5/1997 | Manabe et al. |
| 5,647,662 | A | 7/1997 | Ziegler et al. |
| 5,691,886 | A | 11/1997 | Stacy |
| 5,706,419 | A | 1/1998 | Matsugu et al. |
| 5,717,605 | A | 2/1998 | Komiya et al. |
| 5,752,075 | A | 5/1998 | Kikinis |
| 5,757,347 | A | 5/1998 | Han |
| 5,828,485 | A | 10/1998 | Hewlett |
| 5,900,685 | A | 5/1999 | Evans et al. |
| 5,938,319 | A | 8/1999 | Hege |
| 5,940,204 | A | 8/1999 | Hewlett |
| 5,953,151 | A | 9/1999 | Hewlett |
| 5,953,152 | A | 9/1999 | Hewlett |
| 6,126,288 | A | 10/2000 | Hewlett |
| 6,128,077 | A | 10/2000 | Jovin et al. |
| 6,163,339 | A * | 12/2000 | Meunier .................. 348/218.1 |
| 6,175,771 | B1 | 1/2001 | Hunt et al. |
| 6,188,933 | B1 | 2/2001 | Hewlett et al. |
| 6,208,087 | B1 | 3/2001 | Hughes et al. |
| 6,219,093 | B1 | 4/2001 | Perry |
| 6,220,730 | B1 | 4/2001 | Hewlett et al. |
| 6,261,636 | B1 | 7/2001 | Hewlett |
| 6,278,542 | B1 | 8/2001 | Hewlett |
| 6,278,563 | B1 | 8/2001 | Hewlett |
| 6,288,828 | B1 | 9/2001 | Hewlett |
| 6,421,165 | B2 | 7/2002 | Hewlett |
| 6,430,934 | B2 | 8/2002 | Evans et al. |
| 6,515,435 | B2 | 2/2003 | Hughes et al. |
| 6,523,353 | B2 | 2/2003 | Evans et al. |
| 6,536,922 | B1 | 3/2003 | Hewlett et al. |
| 6,549,326 | B2 | 4/2003 | Hunt et al. |
| 6,565,941 | B1 | 5/2003 | Hewlett |
| 6,601,974 | B1 | 8/2003 | Hewlett et al. |
| 6,617,792 | B2 | 9/2003 | Hughes et al. |
| 6,622,053 | B1 | 9/2003 | Hewlett et al. |
| 6,648,286 | B1 | 11/2003 | Evans et al. |
| 6,671,005 | B1 | 12/2003 | Pujol et al. |
| 6,682,031 | B2 | 1/2004 | Evans et al. |
| 6,696,101 | B2 | 2/2004 | Hewlett |
| 6,736,528 | B2 | 5/2004 | Hunt et al. |
| 6,771,411 | B2 | 8/2004 | Hewlett |
| 6,775,991 | B2 | 8/2004 | Evans et al. |
| 6,801,353 | B2 | 10/2004 | Hunt et al. |
| 6,812,653 | B2 | 11/2004 | Belliveau |
| 6,891,686 | B2 | 5/2005 | Hewlett |
| 6,988,817 | B2 | 1/2006 | Hewlett et al. |
| 7,000,417 | B2 | 2/2006 | Evans et al. |
| 7,078,869 | B2 | 7/2006 | Hughes et al. |
| 7,224,509 | B2 | 5/2007 | Hewlett |
| 2001/0029740 | A1 | 10/2001 | Evans et al. |
| 2001/0030269 | A1 | 10/2001 | Evans et al. |
| 2001/0036003 | A1 | 11/2001 | Hewlett |
| 2001/0047212 | A1 | 11/2001 | Hewlett et al. |
| 2002/0018284 | A1 | 2/2002 | Hewlett |
| 2002/0070686 | A1 | 6/2002 | Hughes et al. |
| 2002/0101199 | A1 | 8/2002 | Hughes et al. |
| 2002/0109905 | A1 | 8/2002 | Hunt et al. |
| 2002/0124573 | A1 | 9/2002 | Evans et al. |
| 2002/0141037 | A1 | 10/2002 | Hunt et al. |
| 2002/0181070 | A1 | 12/2002 | Hewlett |
| 2003/0131610 | A1 | 7/2003 | Evans et al. |
| 2003/0147117 | A1 | 8/2003 | Hewlett |
| 2003/0185010 | A1 | 10/2003 | Hewlett et al. |
| 2003/0198782 | A1 | 10/2003 | Hewlett |
| 2004/0021689 | A1 | 2/2004 | Parker et al. |
| 2004/0046514 | A1 | 3/2004 | Hughes et al. |
| 2004/0065796 | A1 | 4/2004 | Evans et al. |
| 2004/0160198 | A1 | 8/2004 | Hewlett et al. |
| 2004/0161590 | A1 | 8/2004 | Hewlett |
| 2004/0168444 | A1 | 9/2004 | Evans et al. |
| 2005/0207045 | A1 | 9/2005 | Hewlett |
| 2006/0146393 | A1 | 7/2006 | Hewlett |
| 2006/0150636 | A1 | 7/2006 | Evans et al. |
| 2006/0187532 | A1 | 8/2006 | Hewlett et al. |
| 2006/0193136 | A1 | 8/2006 | Hewlett et al. |
| 2006/0208665 | A1 | 9/2006 | Hughes et al. |

FOREIGN PATENT DOCUMENTS

| | | |
|---|---|---|
| EP | 0 399 496 | 11/1990 |
| EP | 0 511 829 | 11/1992 |
| EP | 0 662 773 | 7/1995 |
| GB | 2 267 788 | 12/1993 |
| JP | 04-002004 | 1/1992 |
| JP | 05-181110 | 7/1993 |
| JP | 05-191726 | 7/1993 |
| JP | 07-507155 | 8/1995 |
| JP | 07-262382 | 10/1995 |
| JP | 07-302271 | 11/1995 |
| JP | 2000-504847 | 4/2000 |
| WO | WO93/18620 | 9/1993 |
| WO | WO97/29396 | 8/1997 |

* cited by examiner

PROGRAMMABLE LIGHT BEAM SHAPE ALTERING DEVICE USING PROGRAMMABLE MICROMIRRORS

CROSS-REFERENCE TO RELATED APPLICATIONS

This application is a divisional of U.S. application Ser. No. 10/373,412, filed Feb. 24, 2003, which is a divisional of U.S. application Ser. No. 10/197,963, filed Jul. 16, 2002, now U.S. Pat. No. 6,771,411, which is a continuation of U.S. application Ser. No. 09/928,220, filed Aug. 9, 2001, now U.S. Pat. No. 6,421,165, which is a continuation of U.S. application Ser. No. 09/359,064, filed Jul. 21, 1999, now U.S. Pat. No. 6,288,828, which is a divisional of U.S. application Ser. No. 08/962,237, filed Oct. 31, 1997, now U.S. Pat. No. 5,953,151, which is a divisional of U.S. application Ser. No. 08/598,077, filed Feb. 7, 1996, now U.S. Pat. No. 5,828,485.

FIELD OF THE INVENTION

The present invention relates to a programmable light beam shaping device. More specifically, the present invention teaches a control system and micromirror device which can alter the shape of light beams passing therethrough, and provide various effects to those shaped light beams.

BACKGROUND OF THE INVENTION

It is known in the art to shape a light beam. This has typically been done using an element known as a gobo. A gobo element is usually embodied as either a shutter or an etched mask. The gobo shapes the light beam like a stencil in the projected light.

Gobos are simple on/off devices: they allow part of the light beam to pass, and block other parts to prevent those other parts from passing. Hence mechanical gobos are very simple devices. Modern laser-etched gobos go a step further by providing a gray scale effect.

Typically multiple different gobo shapes are obtained by placing the gobos are placed into a cassette or the like which is rotated to select between the different gobos. The gobos themselves can also be rotated within the cassette, using the techniques, for example, described in U.S. Pat. Nos. 5,113,332 and 4,891,738.

All of these techniques, have the drawback that only a limited number of gobo shapes can be provided. These gobo shapes must be defined in advance. There is no capability to provide any kind of gray scale in the system. The resolution of the system is also limited by the resolution of the machining. This system allows no way to switch gradually between different gobo shapes. In addition, moving between one gobo and another is limited by the maximum possible mechanical motion speed of the gobo-moving element.

Various patents and literature have suggested using a liquid crystal as a gobo. For example, U.S. Pat. No. 5,282,121 describes such a liquid crystal device. Our own pending patent application also so suggests. However, no practical liquid crystal element of this type has ever been developed. The extremely high temperatures caused by blocking some of this high intensity beam produce enormous amounts of heat. The projection gate sometimes must block beams with intensities in excess of 10,000 lumens and sometimes as high as 2000 watts. The above-discussed patent applications discuss various techniques of heat handling. However, because the light energy is passed through a liquid crystal array, some of the energy must inevitably be stored by the liquid crystal. Liquid crystal is not inherently capable of storing such heat, and the phases of the liquid crystal, in practice, may be destabilized by such heat. The amount of cooling required, therefore, has made this an impractical task. Research continues on how to accomplish this task more practically.

It is an object of the present invention to obviate this problem by providing a digital light beam shape altering device, e.g. a gobo, which operates completely differently than any previous device. Specifically, this device embodies the inventor's understanding that many of the heat problems in such a system are obviated if the light beam shape altering device would selectively deflect, instead of blocking, the undesired light.

The preferred mode of the present invention uses a digitally-controlled micromirror semiconductor device. However, any selectively-controllable multiple-reflecting element could be used for this purpose. These special optics are used to create the desired image using an array of small-sized mirrors which are movably positioned. The micromirrors are arranged in an array that will define the eventual image. The resolution of the image is limited by the size of the micromirrors: here 17 um on a side.

The mirrors are movable between a first position in which the light is directed onto the field of a projection lens system, or a second position in which the light is deflected away from the projection lens system. The light deflected away from the lens will appear as a dark point in the resulting image on the illuminated object. The heat problem is minimized according to the present invention since the micromirrors reflect the unwanted light rather than absorbing it. The absorbed heat is caused by the quantum imperfections of the mirror and any gaps between the mirrors.

A digital micromirror integrated circuit is currently manufactured by Texas Instruments Inc., Dallas, Tex., and is described in "an overview of Texas Instrument digital micromirror device (DMD) and its application to projection displays". This application note describes using a digital micromirror device in a television system. Red, green and blue as well as intensity grey scales are obtained in this system by modulating the micromirror device at very high rates of speed. The inventor recognized that this would operate perfectly to accomplish his objectives.

It is hence an object of the present invention to adapt such a device which has small-sized movable, digitally controllable mirrors which have positions that can be changed relative to one another, to use as a light beam shape altering device in this stage lighting system.

It is another object of the present invention to use such a system for previously unheard-of applications. These applications include active simulation of hard or soft beam edges on the gobo. It is yet another application of the present invention to allow gobo cross-fading using time control, special effects and morphing.

It is yet another object of the present invention to form a stroboscopic effect with variable speed and intensity in a stage lighting system. This includes simulation of a flower strobe.

Yet another object of the present invention is to provide a multiple colored gobo system which can have split colors and rotating colors.

It is yet another object of the present invention to carry out gobo rotation in software, and to allow absolute position and velocity control of the gobo rotation using a time slicing technique.

Another objective is to allow concentric-shaped images and unsupported images.

It is yet another object of the invention to provide a control system for the micromirror devices which allows such operation.

Yet another particularly preferred system is a shadowless follow spot, which forms an illuminating beam which is roughly of the same shape as the performer, and more preferably precisely the same as the performer. The beam shape of the beam spot also tracks the performer's current outline. The spot light follows the performer as it lights the performer. This action could be performed manually by an operator or via an automated tracking system, such as Wybron's autopilot.

Since the beam does not overlap the performer's body outline, it does not cast a shadow of the performer.

BRIEF DESCRIPTION OF THE DRAWINGS

These and other objects will be readily understood with reference to the accompanying drawings, in which.

DESCRIPTION OF THE PREFERRED EMBODIMENT

The preferred embodiment herein begins with a brief description of controllable mirror devices, and the way in which the currently-manufactured devices operate.

Work on semiconductor-based devices which tune the characteristics of light passing therethrough has been ongoing since the 1970's. There are two kinds of known digital micromirror devices. A first type was originally called the formal membrane display. This first type used a silicon membrane that was covered with a metalized polymer membrane. The metalized polymer membrane operated as a mirror.

A capacitor or other element was located below the metalized element. When the capacitor was energized, it attracted the polymer membrane and changed the direction of the resulting reflection.

More modern elements, however, use an electrostatically deflected mirror which changes in position in a different way. The mirror of the present invention, developed and available from Texas Instruments, Inc. uses an aluminum mirror which is sputter-deposited directly onto a wafer.

Figure 1:
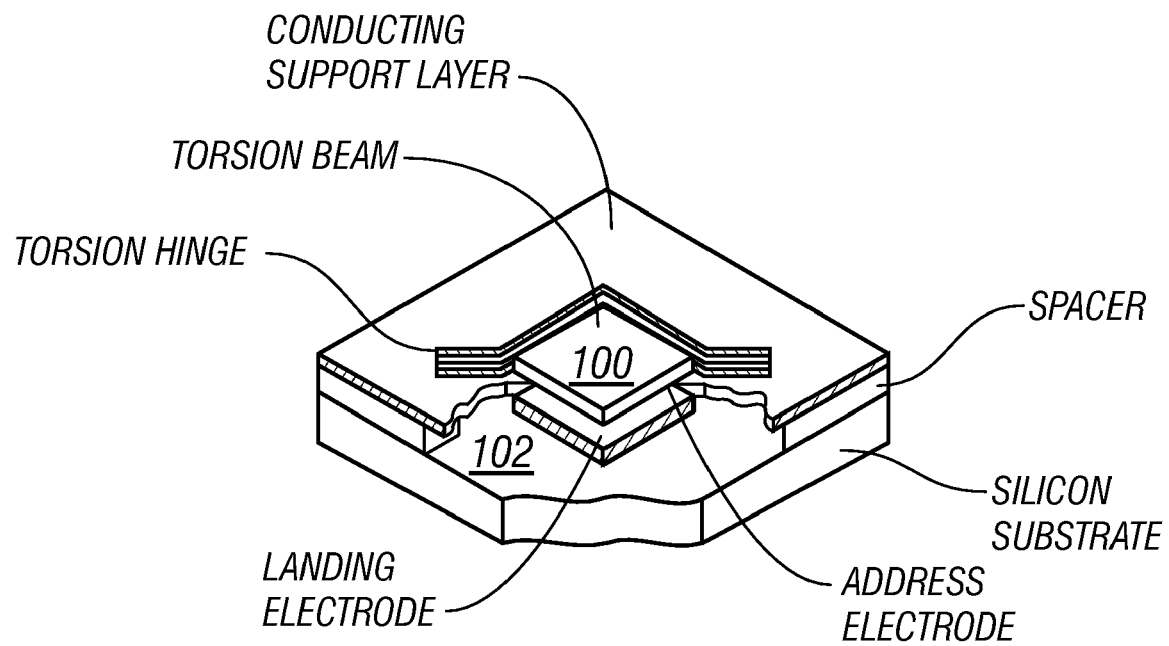
FIG. 1 shows a single pixel mirror element of the preferred mode, in its first position.
Figure 2:
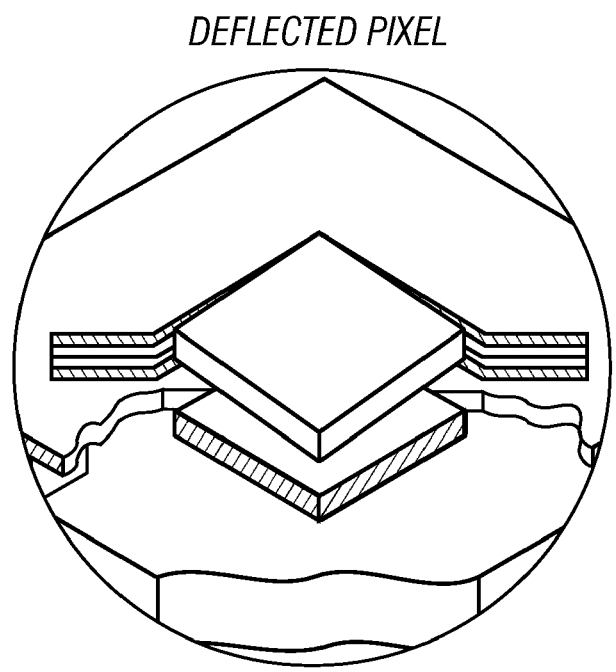
FIG. 2 shows the mirror element in its second position.

The individual mirrors are shown in FIG. 1. Each individual mirror includes a square mirror plate 100 formed of reflective aluminum cantilevered on hollow aluminum post on flexible aluminum beams. Each of these mirrors 100 has two stop positions: a landing electrode, which allows them to arrive into a first position shown in FIG. 2, and another electrode against which the mirror rests when in its non-deflected position. These mirrors are digital devices in the sense that there two "allowable" positions are either in a first position which reflects light to the lens and hence to the illuminated object, and a second position where the light is reflected to a scattered position. Light scattering (i.e. selective light reflection) of this type could also be done with other means, i.e. selectively polarizable polymers, electronically-controlled holograms, light valves, or any other means.

Figure 3:
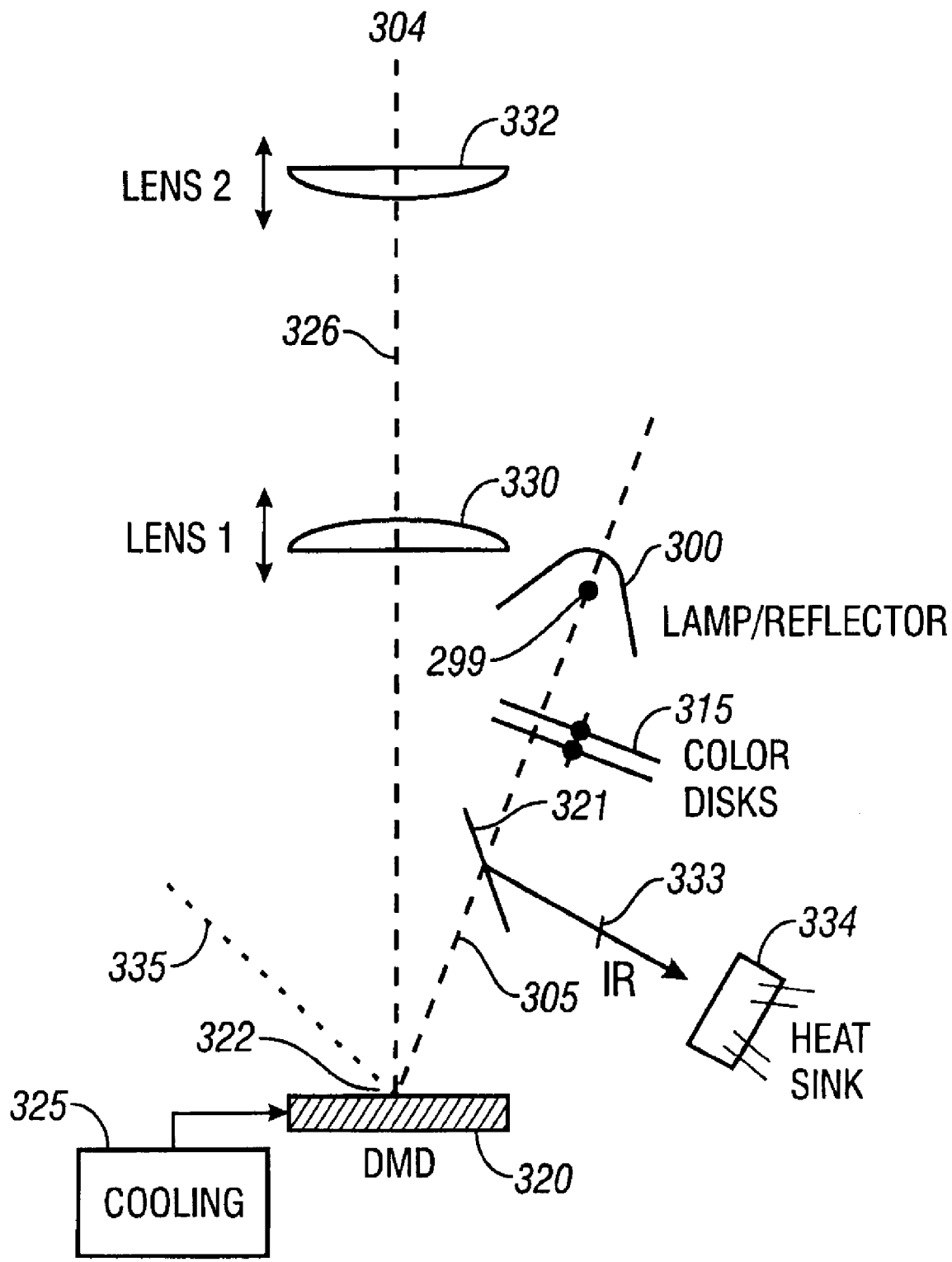
FIG. 3 shows the mirror assembly of the present invention and its associated optics.

The operation of the dark field projection optics which is used according to the preferred micromirror device is shown in FIG. 3. The two bi-stable positions of the preferred devices are preferably plus or minus 10% from the horizontal.

An incoming illumination bundle 305 is incident at an arc of less than 20° on the digital micromirror device 320. The illumination bounces off the mirrors in one of two directions 326 or 335 depending on the mirror position. In the first direction 326, the position we call "on", the information is transmitted in the 0° direction towards lenses 330, 332 which focus the information to a desired location 304. In the second direction of the mirror, the position we call "off", the information is deflected away from the desired location to the direction 335.

The human eye cannot perceive actions faster than about 1/30 second. Importantly, the mirror transit time from tilted left to tilted right is on the order of 10 µs. This allows the pixels to be changed in operation many orders of magnitude faster than the human eye's persistence of vision.

Light source 299 used according to the present invention is preferably a high intensity light source such as a xenon or metal halide bulb of between 600 and 1000 watts. The bulb is preferably surrounded by a reflector 300 of the parabolic or ellipsoidal type which directs the output from light source 299 along a first optical incidence path 305.

The preferred embodiment of the invention provides a color cross-fading system 315, such as described in my U.S. Pat. No. 5,426,576. Alternately, however, any other color changing system could be used. This cross-fading system adjusts the color of the light. The light intensity may also be controlled using any kind of associated dimmer; either electronic, mechanical or electromechanical means. More preferably, the DMD 320 could be used to control beam intensity as described herein.

The light beam projected along path 305 is incident to the digital light altering device embodied as DMD 320, at point 322. The DMD allows operations between two different states. When the mirror in the DMD is pointed to the right, the right beam is reflected along path 326 to projection/zoom lens combination 330, 332. The zoom lens combination 330, 332 is used to project the image from the DMD 320 onto the object of illumination, preferably a stage. The size and sharpness quality of the image can therefore be adjusted by repositioning of the lens. When the mirror is tilted to the right, the light beam is projected along the light path 335, away from projection lens 330/332. The pixels which have light beams projected away from the lens appear as dark points in the resulting image. The dark spots are not displayed on the stage.

This DMD system reflects information from all pixels. Hence, minimal energy is absorbed in the DMD itself or any of the other optics. The device still may get hot, however not nearly as hot as the liquid crystal gobos. Cooling 325 may still be necessary. The DMDs can be cooled using a heat sink and convection, or by blowing cold air from a refrigeration unit across the device. More preferably, a hot or cool mirror can be used in the path of the light beam to reflect infrared out of the light beam to minimize the transmitted heat. FIG. 3 shows hot mirror 321 reflecting infra red 333 to heat sink 334. A cold mirror would be used with a folded optical path.

This basic system allows selecting a particular aperture shape with which to which pass the light. That shape is then defined in terms of pixels, and these pixels are mapped to DMD 320. The DMD selectively reflects light of the properly-shaped aperture onto the stage. The rest of the light is reflected away, e.g. to a heat sink.

The micromirror can be switched between its positions in approximately 10 μs. A normal time for frame refresh rate, which takes into account human persistence of vision, is 1/60th of a second or 60 hertz. Various effects can be carried out by modulating the intensity of each mirror pixel within that time frame.

The monolithic integration which is being formed by Texas Instruments includes associated row and column decoders thereon. Accordingly, the system of the present invention need not include those as part of its control system.

Figure 4:
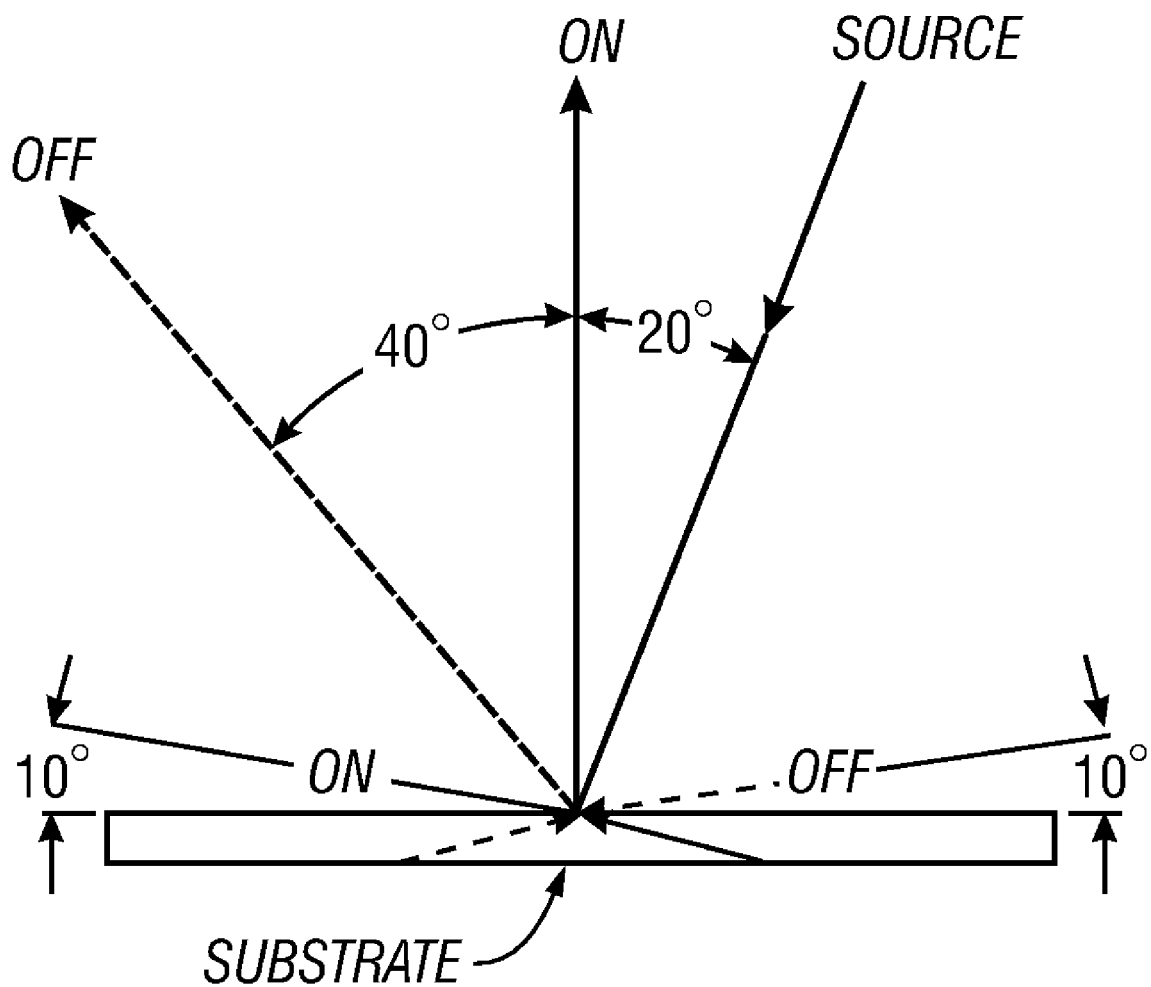
FIG. 4 shows more detail about the reflection carried out by the DMD of the present invention.

Detailed operation of DMD 320 is shown in FIG. 4. The source beam is input to the position 322 which transmits the information either towards the stage along path 326 or away from the stage along path 335.

The various effects which are usable according to the present invention include automatic intensity dimming, use of a "shadowless follow spot", hard or soft beam edges, shutter cut simulation, gobo cross fading, gobo special effects, stroboscopic effects, color gobos, rotating gobos including absolute position and velocity control, and other such effects and combinations thereof. All of these effects can be controlled by software running on the processor device. Importantly, the characteristics of the projected beam (gobo shape, color etc) can be controlled by software. This enables any software effect which could be done to any image of any image format to be done to the light beam. The software that is used is preferably image processing software such as Adobe Photoshop™, Kai's power tools™ or the like which are used to manipulate images. Any kind of image manipulation can be mapped to the screen. Each incremental change to the image can be mapped to the screen as it occurs.

Another important feature of the gobo is its ability to project unconnected shapes that cannot be formed by a stencil. An example is two concentric circles. A concentric circle gobo needs physical connection between the circles. Other unconnected shapes which are capable of rendering as an image can also be displayed.

The effects carried out by the software are grouped into three different categories: an edge effects processing; an image shape processing; and a duty cycle processing.

Figure 5:
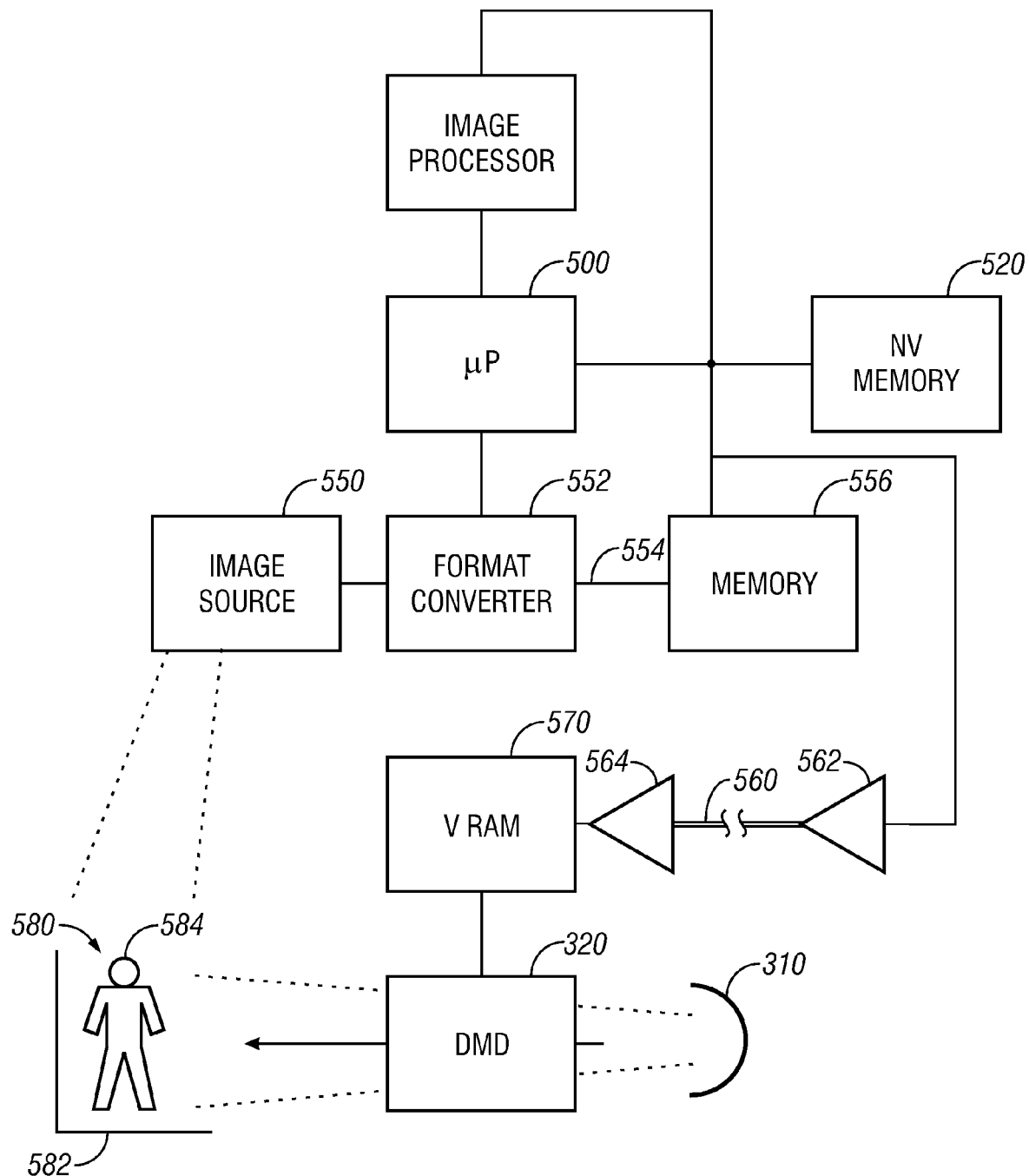
FIG. 5 shows a block diagram of the control electronics of the present invention.

The overall control system is shown in block diagram form in FIG. 5. Microprocessor 500 operates based on a program which executes, inter alia, the flowchart of FIG. 6. The light shape altering operates according to a stencil outline. This stencil outline can be any image or image portion. An image from image source 550 is input to a format converter 552 which converts the image from its native form into digital image that is compatible with storage on a computer. The preferred digital image formats include a bitmap format or compressed bitmap form such as the GIF, JPEG, PCX format (1 bit per pixel) file, a "BMP" file (8 bits/pixel B/W or 24 bits/pixel color) or a geometric description (vectorized image). Moving images could also be sent in any animation format such as MPEG or the like. It should be understood that any image representation format could be used to represent the image, and that any of these representations can be used to create information that can modify reflecting positions of the array of reflecting devices. The present specification uses the term "digital representation" to generically refer to any of these formats that can be used to represent an image, and are manipulable by computers.

Image 554 is input into a working memory 556. BMP format represents each "pixel" picture element of the image by a number of bits. A typical gray scale bit map image has 8 bits representing each pixel. A colored image of this type has 8 bits representing each of red, green, and blue representations. This color representation is called a 24-bit representation, since 24-bits are necessary for each pixel. The description herein will be given with reference to gray scale images although it should be understood that this system can also be used with color images by forming more detailed maps of the information. Bit maps are easiest to process, but extremely wasteful of storage space.

Each memory area, representing each pixel, therefore, has 8 bits therein. The memory 556 is 576×768 area, corresponding to the number of mirror elements in the preferred use.

This image is defined as image No. x, and can be stored in non-volatile memory 520 (e.g., flash RAM or hard disk) for later recall therefrom. An important feature of the present invention is that the images are stored electronically, and hence these images can also be electronically processed in real time using image processing software. Since the preferred mode of the present invention manipulates the image information in bitmap form, this image processing can be carried out in a very quick succession.

The image to be projected is sent, by processor 500, over channel 560, to VRAM 570. Line driver 562 and line receiver 564 buffer the signal at both ends. The channel can be a local bus inside the lamp unit, or can be a transmission line, such as a serial bus. The image information can be sent in any of the forms described above. Standard and commonly available image processing software is available to carry out many functions described herein. These include for example, morphing, rotating, scaling, edge blurring, and other operations that are described herein. Commercial image processing can use "Kai's Power Tools", "CorelDraw!", or "Morph Studio" for example. These functions are shown with reference to the flowchart of FIG. 6.

Step 600 represents the system determining the kind of operation which has been requested: between edge processing, image processing, and duty cycle processing. The image processing operations will be defined first. Briefly stated, the image processing operations include rotation of the image, image morphing from image 1 to image 2, dynamic control of image shape and special effects. Each of these processing elements can select the speed of the processing to effectively time-slice the image. The morphing of the present invention preferably synchronizes keyframes of the morph with desired time slices.

Step 602 defines the operation. As described above, this operation can include rotation, position shift, and the like. Step 604 defines the time or velocity of operation. This time can be ending time for all or part of the movement, or velocity of the movement. Note that all of the effects carried out in step 602 require moving some part of the image from one position to another.

Step 606 determine the interval of slicing, depending on the velocity. It is desirable to slice an appropriate amount such that the user does not see jerky motion. Ideally, in fact, we could slice movement of the image one pixel at a time, but this is probably unnecessary for most applications. One hundred pixel slicing is probably sufficient for all applications. The pixel slices are selected at step 606.

Step 608 calculates using the time or velocity entered at step 604 to determine the necessary time for operation based on the amount of position shift for rotation over 100 pixel slices. This is done as follows. Position shift, rotate, and sprite animation are all simple movements. In both, the points of the image which define the gobo shape move over time. It is important, therefore, to decide how much movement there is and how much time that movement will take. A rate of change of points or velocity is then calculated. Of course velocity need not be calculated if it has already been entered at step 604.

Having velocity of movement and pixels per second, the time between slices is calculated using 100 pixels per slice divided by the velocity in pixels per second. The direction of movement is defined by this operation.

Therefore, the image is recalculated at step 610 for each time interval. This new image becomes the new gobo stencil at the new location. That is to say, the outline of the image is preferably used as the gobo—light within the image is passed, and light outside the image is blocked. In the color embodiment described herein, more sophisticated operations can be carried out on the image. For example, this is not limited to stencil images, and could include for example concentric circles or letter text with font selection.

At any particular time, the image in the VRAM 570 is used as the gobo stencil. This is carried out as follows. Each element in the image is a gray scale of 8-bits. Each 1/60th of a second is time-sliced into 256 different periods. Quite conveniently, the 8-bit pixel image corresponds to $2^8=256$.

A pixel value of 1 indicates that light at the position of the pixel will be shown on the stage. A pixel value of zero indicates that light at the position of the pixel will not be shown on the stage. Any gray scale value means that only part of the intensity pixel will be shown (for only part of the time of the 1/60th of a second time slice). Hence, each element in the memory is applied to one pixel of the DMD, e.g. one or many micromirrors, to display that one pixel on the stage.

Figure 7:
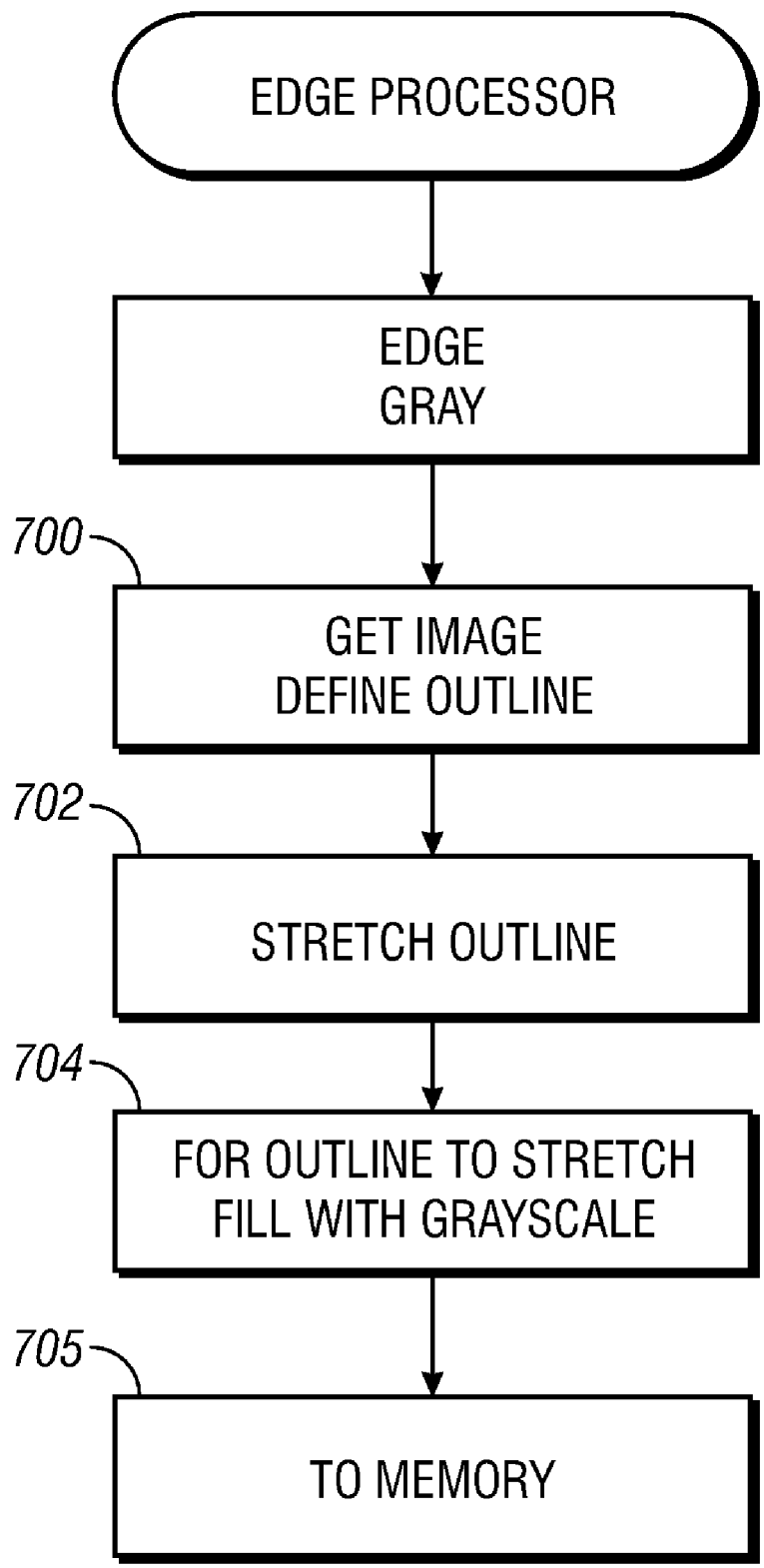
FIG. 7 shows a flowchart of operation of edge effects operations.

When edge processing is selected at step 600, control passes to the flowchart of FIG. 7. The edge graying can be selected as either a gradual edge graying or a more abrupt edge graying. This includes one area of total light, one area of only partial light, and one area of no light. The intensity of the gray scaled outline is continuously graded from full image transmission to no image transmission. The intensity variation is effected by adjusting the duty cycle of the on and off times.

Step 700 obtains the image and defines its outlines. This is carried out according to the present invention by determining the boundary point between light transmitting portions (1's) and light blocking portions (0's). The outline is stretched in all directions at step 702 to form a larger but concentric image—a stretched image.

The area between the original image and the stretched image is filled with desired gray scale information. Step 704 carries this out for all points which are between the outline and the stretch image.

This new image is sent to memory 570 at step 706. As described above, the image in the memory is always used to project the image-shaped information. This uses standard display technology whereby the display system is continually updated using data stored in the memory.

Figure 6:
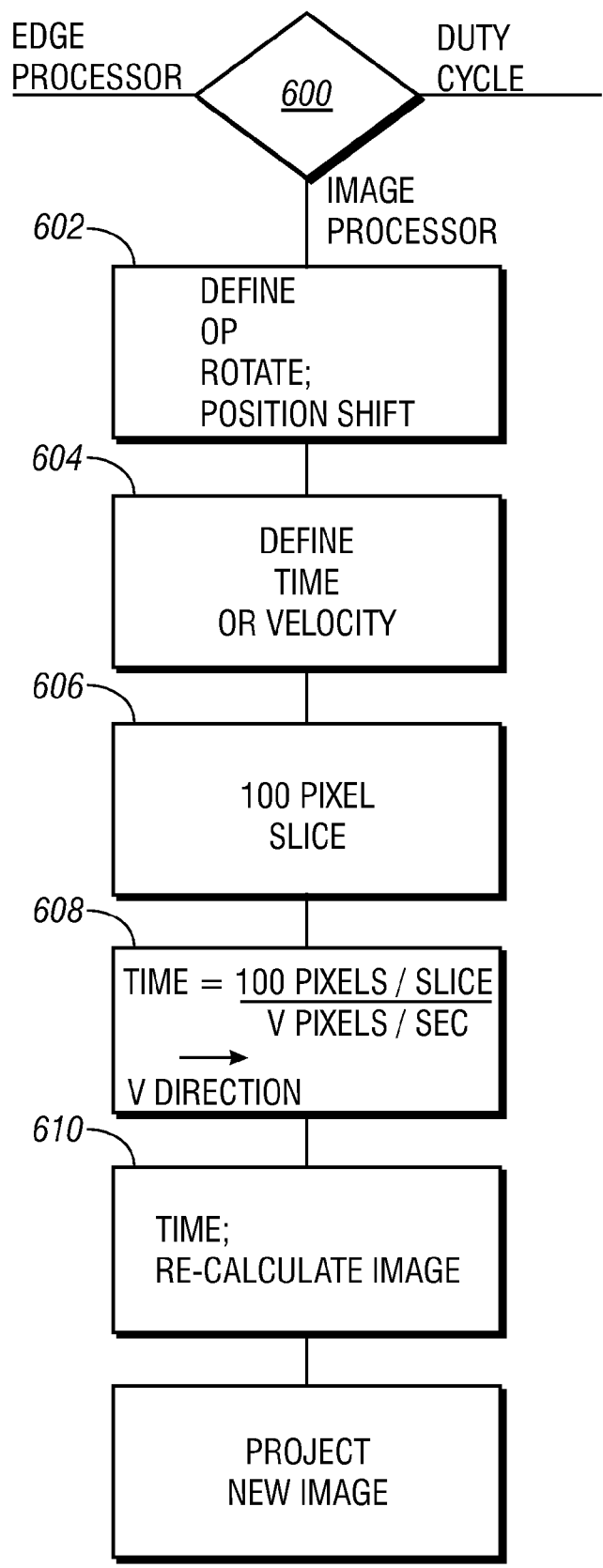
FIG. 6 shows a flowchart of a typical operation of the present invention.

The duty cycle processing in the flowchart of FIG. 6 is used to form strobe effects and/or to adjust intensity. In both cases, the image is stored in memory and removed from memory at periodic intervals. This operation prevents any light from being projected toward the stage at those intervals, and is hence referred to as masking. When the image is masked, all values in the memory become zero, and hence this projects all black toward the source. This is done for a time which is shorter than persistence of vision, so the information cannot be perceived by the human eye. Persistence of vision averages the total light impinging on the scene. The eye hence sees the duty cycle processing as a different intensity.

The stroboscopic effect turns on and off the intensity, ranging from about 1 Hz to 24 Hz. This produces a strobe effect.

These and other image processing operations can be carried out: (1) in each projection lamp based on a pre-stored or downloaded command; (2) in a main processing console; or (3) in both.

Another important aspect of the invention is based on the inventor's recognition of a problem that has existed in the art of stage lighting. Specifically, when a performer is on the stage, a spotlight illuminates the performer's area. However, the inventor of the present invention recognized a problem in doing this. Specifically, since we want to see the performer, we must illuminate the performer's area. However, when we illuminate outside the performer's area, it casts a shadow on the stage behind the performer. In many circumstances, this shadow is undesirable.

It is an object of this embodiment to illuminate an area of the stage confined to the performer, without illuminating any location outside of the performer's area. This is accomplished according to the present invention by advantageous processing structure which forms a "shadowless follow spot". This is done using the basic block diagram of FIG. 10.

Figure 10:
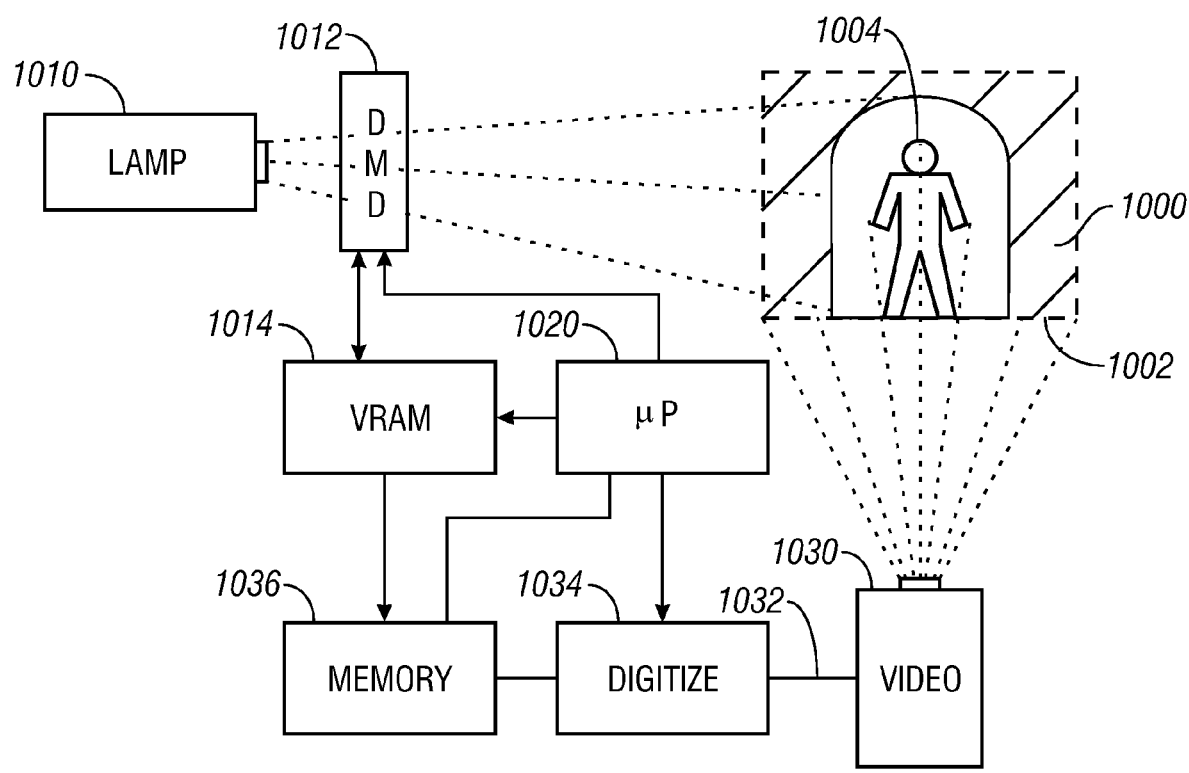
FIG. 10 shows a block diagram of the shadowless follow spot embodiment.

The preferred hardware is shown in FIG. 10. Processor 1020 carries out the operations explained with reference to the following flowcharts which define different ways of following the performer. In all of these embodiments, the shape of the performer on the stage is determined. This can be done by (1) determining the performer's shape by some means, e.g. manual, and following that shape; (2) correlating over the image looking for a human body shape; (3) infra red detection of the performer's location followed by expanding that location to the shape of the performer; (4) image subtraction; (5) detection of special indices on the performer, e.g. an ultrasonic beacon, or, any other technique even manual following of the image by, for example, an operator following the performer's location on a screen using a mouse.

Figure 8A:
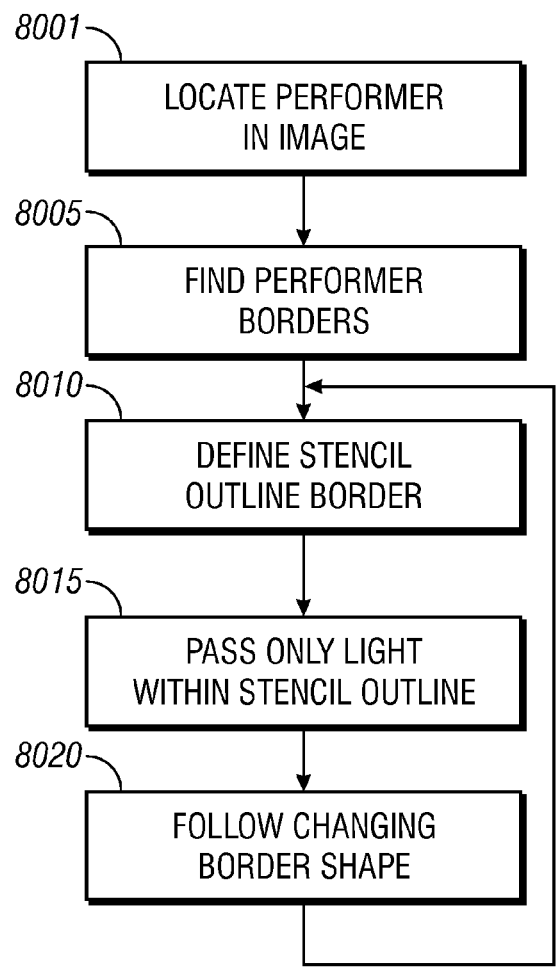
FIG. 8A shows a flowchart of a first technique of following a performer on stage.

FIG. 8A shows a flowchart of (1) above. At step 8001, the performer is located within the image. The camera taking the image is preferably located at the lamp illuminating the scene in order to avoid parallax. The image can be manually investigated at each lamp or downloaded to some central processor for this purpose.

Once identified, the borders of the performer are found at 8005. Those borders are identified, for example, by abrupt color changes near the identified point. At step 8010, those changes are used to define a "stencil" outline that is slightly smaller than the performer at 8010. That stencil outline is used as a gobo for the light at 8015.

The performer continues to move, and at 8020 the processor follows the changing border shape. The changing border shape produces a new outline which is fed to 8010 at which time a new gobo stencil is defined.

Figure 8B:
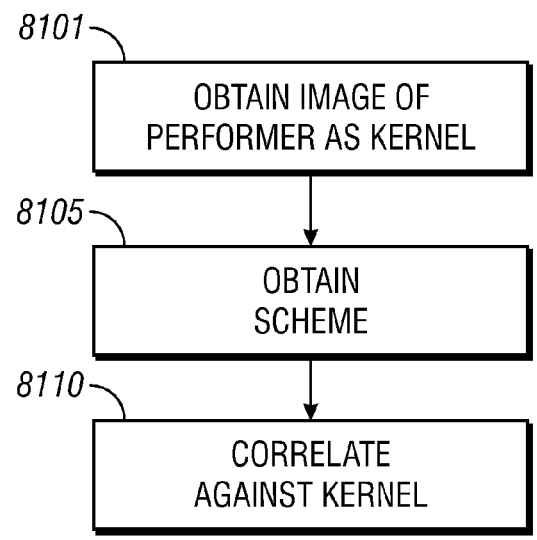
FIG. 8B shows a flowchart of a correlation scheme.

Alternative (2) described above is a correlation technique. A flowchart of this operation is shown in FIG. 8B. At step 8101, the camera obtains an image of the performer, and the performer is identified within that image. That image issued as a kernel for further later correlation. The entire scene is obtained at step 8105. The whole scene is correlated against the kernel at 8110. This uses known image processing techniques.

The above can be improved by (3), wherein infra red detection gives the approximate area for the performer.

As explained in previous embodiments, the DMD is capable of updating its position very often: for example, 106 times a second. This is much faster than any real world image can move. Thirty times a second would certainly be sufficient to image the performer's movements. Accordingly, the present invention allows setting the number of frame updates per second. A frame update time of 30 per second is sufficient for most applications. This minimizes the load on the processor, and enables less expensive image processing equipment to be used.

Figure 8C:
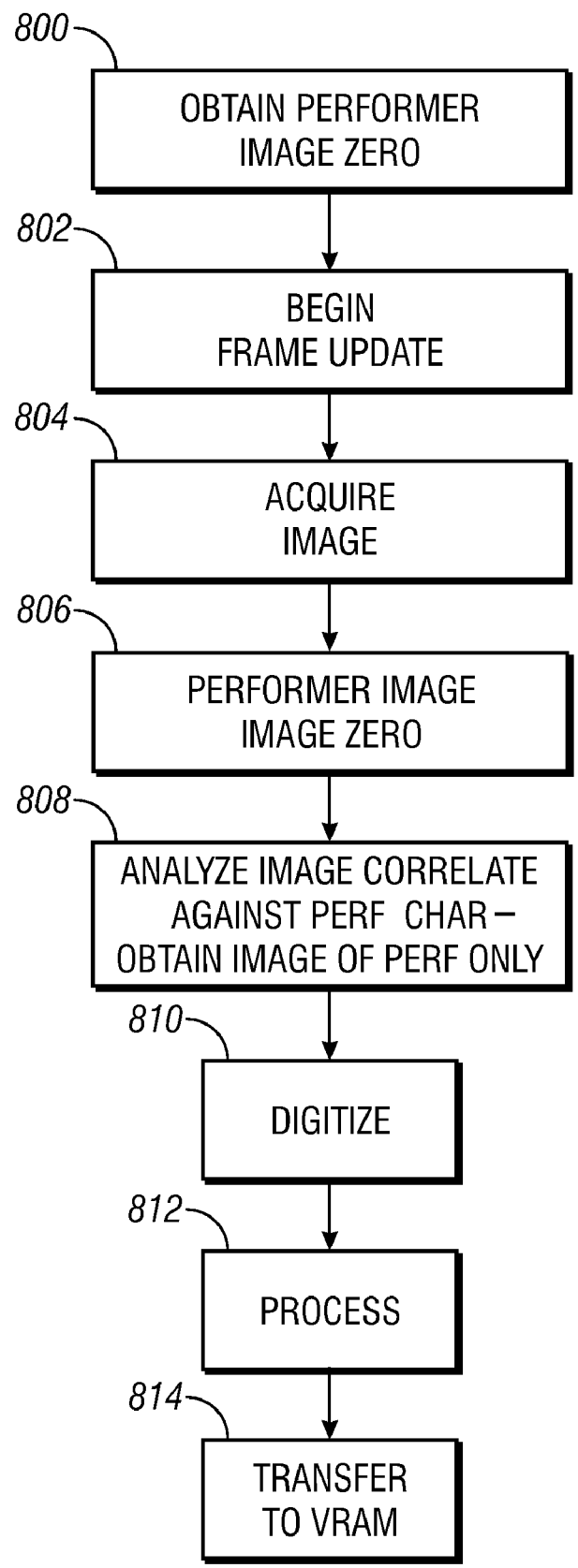
FIG. 8C shows a flowchart of another correlation scheme.

FIG. 8C shows the image subtracting technique.

First, we must obtain a zeroing image. Therefore, the first step at step 800, is to obtain an image of the stage without the performer(s) thereon. This zero image represents what the stage will look like when the performers are not there.

Between processing iterations, the processor can carry out other housekeeping tasks or can simply remain idle.

Step 802 represents the beginning of a frame update. An image is acquired from the video camera 550 at step 804. The image is still preferably arranged in units of pixels, with each pixel including a value of intensity and perhaps red, green, and blue for that pixel.

At step 806 subtracts the current image from the zeroed image. The performer image that remains is the image of the performer(s) and other new elements on the stage only. The computer determines at this time which part of that image we want to use to obtain the shadowless follow spot. This is done at step 808 by correlating the image that remains against a reference, to determine the proper part of the image to be converted into a shadowless follow spot. The image of the performer is separated from other things in the image. Preferably it is known for example what the performer will wear, or some image of a unique characteristic of the performer has been made. That unique characteristic is correlated against the performer image to determine the performer only at the output of step 808. This image is digitized at step 810: that is all parts of this image which are not performer are set to zeros so that light at those positions is reflected. In this way, a gobo-like image is obtained at step 810, that gobo-like image being a changing cutout image of the performer. An optional step 812 further processes this image to remove artifacts, and preferably to shrink the image slightly so that it does not come too close to the edge of the performer's outline. This image is then transferred to the VRAM at step 814, at which time it is re-entered into the DMD 1012 to form a gobo-like mask for the lamp. This allows the light to be appropriately shaped to agree with the outline of the performer 1004.

Another embodiment of the present invention uses the above described techniques and basic system of the present invention to provide color to the lamp gobo. This is done using techniques that were postulated in the early days of color TV, and which now find a renewed use. This system allows colored gobos, and more generally, allows—any video image to be displayed.

Figure 9A:
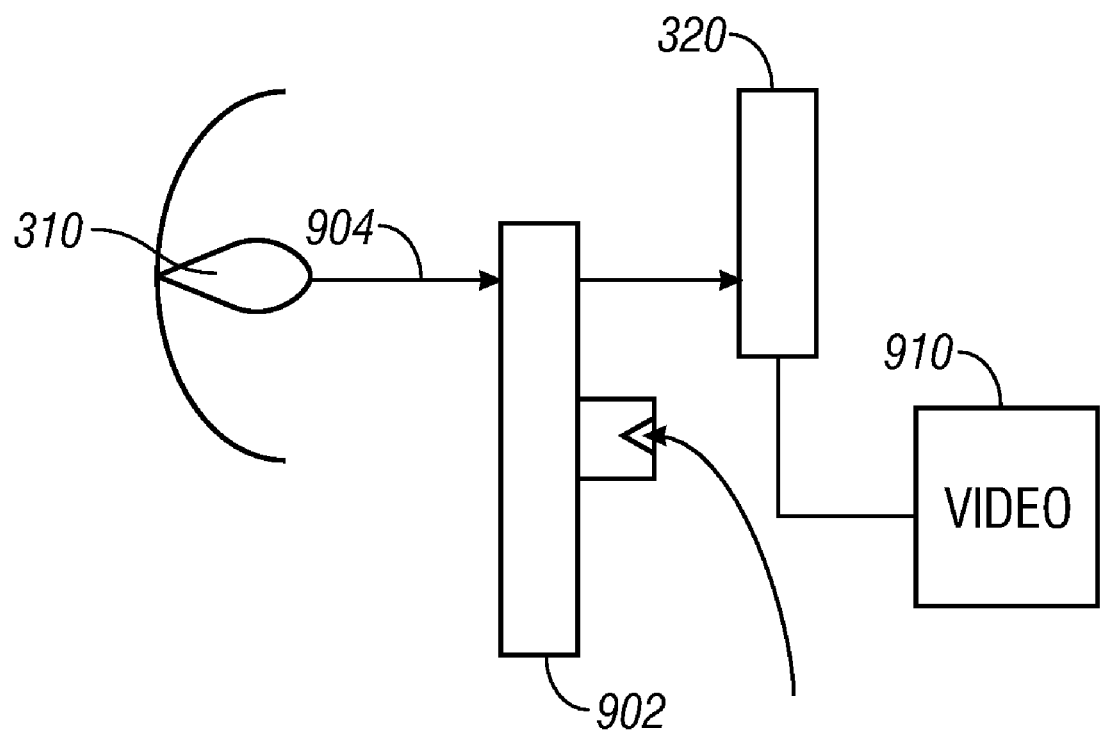
FIG. 9A shows a block diagram of a color projection system of the present invention.
Figure 9B:
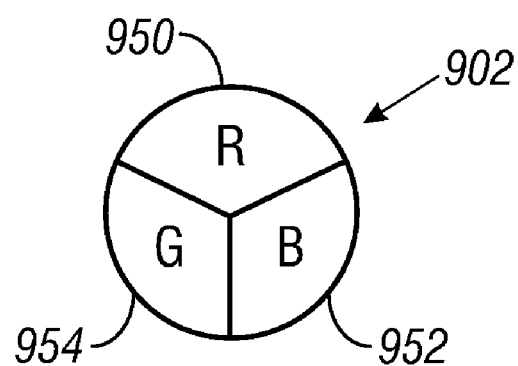
FIG. 9B shows a color wheel of the present invention.

FIG. 9A shows the lamp 310 in a series with a rotating multicolored disk 902. FIG. 9B shows the three sectors of the disk. Red sector 950, a blue sector 952, and a green sector 954. The light along the optical path 904 is colored by passing through one of these three quadrants, and then through DMD 320. DMD 320 is driven by a rotating source 910, synchronized with the operation of spinning of the color disk 902. The video is driven to produce a red frame, then a green frame, then a blue frame, one after another, for example. The red filtered video is transferred at the same moment when the red sector 950 is in the light path. So long as the different colors are switched faster than the eye's persistence of vision, the eye will average them together to see a full color scene.

Although only a few embodiments have been described in detail above, those having ordinary skill in the art will certainly understand that many modifications are possible in the preferred embodiment without departing from the teachings thereof.

All such modifications are intended to be encompassed within the following claims.

For example, any direction deflecting device could be used in place of the DMD. A custom micro mirror device would be transparent, and have thin mirrors that "stowed" at 90° to the light beam to allow the beam to pass, and turned off by moving to a reflecting position to scatter select pixels of the light beam. The color changing devices could be any device including dichroics.

What is claimed is:

1. A method, comprising:
   using a digital device to produce a first color shape at a first time, and to produce a second color shape at a second time, where an interval between said first and second times is shorter than a human's persistence of vision; and
   projecting a composite color beam that is based on a combination of said first color shape at said first time, and said second color shape at said second time, wherein said composite color beam has an outer shape that is controlled by said first and second color shapes.

2. A method as in claim 1, wherein said first and second colors are primary colors.

3. A method as in claim 1, further comprising producing a third color shape at a third time, wherein said first, second and third times are sufficiently close to be within said persistence of vision, and said composite color beam is shaped based on said first, second and third color images.

4. A method as in claim 3, wherein said first, second and third colors are primary colors.

5. A method as in claim 1, wherein said projecting comprises using a rotating color wheel whose rotation is synchronized with said projecting.

6. A method as in claim 1, further comprising image processing to produce said first and second shapes based on an image processed shape.

7. A method as in claim 6, wherein said image processing comprises processing an edge of said shapes to form an effect on said edge of said shapes.

8. A method as in claim 7, wherein said image processing comprises processing said shapes to rotate said composite shape.

9. A method as in claim 7, further comprising morphing from said composite shape to another shape.

10. A method as in claim 7, wherein said image processing comprises duty cycle processing of the composite shape.

11. A method as in claim 10, wherein said duty cycle processing comprises changing the projected composite color beam to effect an effective perceived brightness of the projected beam.

12. A method as in claim 11, wherein said duty cycle processing comprises stretching some part of an outline defining by said projected composite color beam.

13. A method as in claim 11, wherein said image processing comprises changing a position of said projected composite color beam.

14. A method as in claim 11, wherein said image processing comprises determining a new shape to be used in a display of a new projected composite color beam, and selecting a speed with which a current beam will be changed to the new projected composite color beam.

15. A method as in claim 14, wherein said speed comprises a rate at which the image will appear to move between the projected composite color beam and the new projected composite color beam.

16. A method as in claim 15, further comprising updating a beam shape at specified intervals, and changing the content of the beam shape by a specified amount, related to said rate, at each of said specified intervals.

17. A method as in claim 10, wherein said duty cycle processing comprises forming a stroboscopic effect on the projected composite color beam.

18. A method as in claim 7, wherein said image processing comprises correlating against a reference to determine said shapes.

19. A method as in claim 7, wherein said image processing comprises cross fading between a first image shape used for projecting the beam, and a second image shape used for projecting the beam.

20. A method as in claim 1, wherein said first and second color shapes are formed by reading a digital file indicative of a selected shape from a memory, and converting said digital file into a map representing an array of pixels, said map having a value for each of a plurality of pixels, which value represents a state of said each pixel.

21. A method as in claim 20, wherein said map includes multiple color values for each of said pixels of said array respectively used for said first and second color shapes.

22. A method, comprising:
determining a first electronic file indicative of a first shape of a light beam to be projected at a first time;
determining a second electronic file indicative of a second shape of a second light beam to be projected at a second time, after said first time; determining interim files indicative of interim shapes between said first and second light beam shapes; and outputting said interim files to control said shapes of said light beams.

23. A method as in claim 22, further comprising using said files to control a digital light shape altering device, to produce said first and second shapes at said times.

24. A method as in claim 23, further comprising processing an edge of an image to form an effect on said edge of said image.

25. A method as in claim 24, wherein said effect comprises graying an edge of said image by a specified amount.

26. A method as in claim 22, wherein said interim files are each produced at times which are sufficiently close together to prevent a user from perceiving uneven motion of the shapes.

27. A method as in claim 22, wherein said interim files are each produced to cause a maximum pixel shift of x, where x is a number of pixels selected to minimize a chance that a user will perceive uneven motion in the moving shape.

28. A method as in claim 27, wherein x is 100 pixels.

29. A method as in claim 22, wherein said first and second electronic files are representative of maps which represent on and off states of each of a plurality of pixels of an array of pixels.

30. A method as in claim 22, further comprising determining said second electronic file by image processing operation.

31. A method as in claim 22, further comprising processing an image to rotate said image.

32. A method as in claim 22, wherein said interim files represent morphing from said first shape to said second shape.

33. A method as in claim 22, further comprising duty cycle processing an image.

34. A method as in claim 33, wherein said duty cycle processing comprises changing the entire image to effect an effective perceived brightness of the image.

35. A method as in claim 33, wherein said duty cycle processing comprises forming a stroboscopic effect on the image.

36. A method as in claim 33, wherein said duty cycle processing comprises stretching some part of an outline defined by said shape.

37. A method as in claim 22, further comprising updating the shapes at specified intervals, and changing the content of the beam shape by a specified amount, related to said rate, at each of said specified intervals.

38. A method as in claim 22, further comprising cross fading between said first and second image shapes.

39. A method as in claim 22, wherein said image processing comprises dynamically controlling the image shape to dynamically control the shape of the beam.

40. A method as in claim 22, wherein determining each file of each shape comprises reading a digital file indicative of a selected shape from a memory, and converting said digital file into a map representing an array of pixels, said map having a value for each of a plurality of pixels, which value represents a state of said each pixel.

41. A method as in claim 40, wherein said map includes multiple color values for each of said pixels of said array.

42. A method, comprising:
using a first image to form an output signal to control a digital light shape altering device to produce a first shape at a first time;
at a second time, subsequent to said first time, calculating a new image representing a desired incremental change in said first shape and using said new image to control said digital light shape altering device, wherein said desired incremental change represents an incremental change between said first shape and a desired second shape to be produced at a second time after said first shape.

43. A method as in claim 42, further comprising selecting said second shape, and selecting a time associated with producing said second shape, and wherein said calculating comprises calculating an incremental part between said first shape and said second shape.

44. A method as in claim 43, further comprising selecting an action on a file which action results in said second shape, and wherein said action includes an image processing action.

45. A method as in claim 44, wherein said image processing action comprises processing an edge of an image to form an effect on said edge of said image.

46. A method as in claim 44, wherein said image processing action comprises processing an image to rotate said image.

47. A method as in claim 44, wherein said image processing action comprises morphing from said image to said new image.

48. A method as in claim 44, wherein said image processing action comprises duty cycle processing the image.

49. A method as in claim 48, wherein said duty cycle processing comprises changing the entire image to effect an effective perceived brightness of the image.

50. A method as in claim 42, further comprising updating a beam shape at specified intervals, and changing the content of the beam shape by a specified amount, related to said rate, at each of said specified intervals.

51. A method as in claim 42, wherein said incremental change is part of a cross fading a first image shape used for projecting the beam, and a second image shape used for projecting the beam.

52. A method as in claim 42, wherein said using a first image comprises reading a digital file indicative of a selecting shape from a memory, and converting said digital file into a map representing an array of pixels, said map having a value for each of a plurality of pixels, which value represents a state of said each pixel.

* * * * *